April 9, 1963  D. LABINO  3,085,126
METHOD OF PRODUCING A BATTERY SEPARATOR AND PRODUCT THEREOF
Filed Feb. 26, 1960
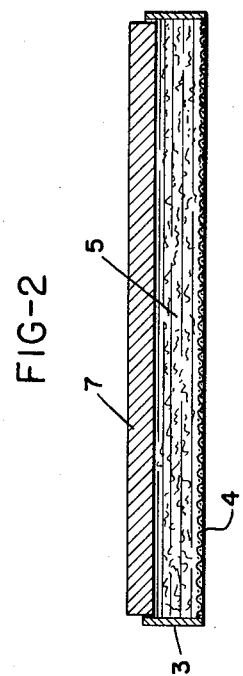
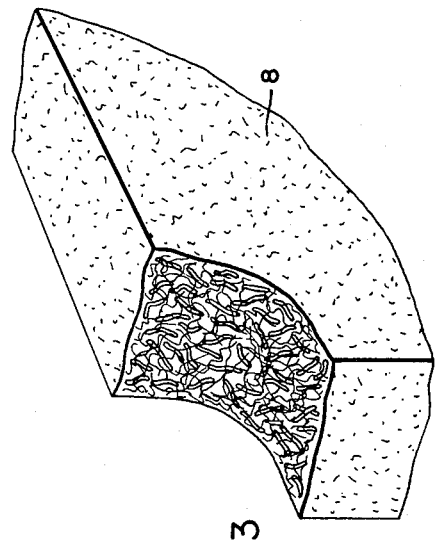
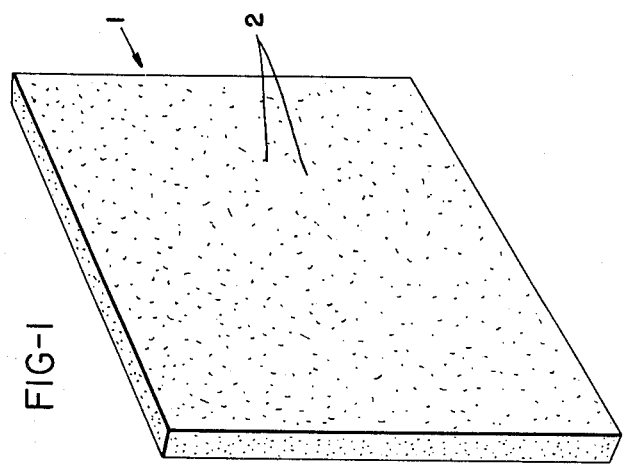
INVENTOR.
DOMINICK LABINO
BY
Nobbe & Swope
ATTORNEYS

United States Patent Office 3,085,126
Patented Apr. 9, 1963

3,085,126
METHOD OF PRODUCING A BATTERY SEPA-
RATOR AND PRODUCT THEREOF
Dominick Labino, Grand Rapids, Ohio, assignor to
Johns-Manville Corporation, New York, N.Y., a corporation of New York
Filed Feb. 26, 1960, Ser. No. 11,373
4 Claims. (Cl. 136—146)

My present invention relates to storage batteries and more particularly to a new and improved battery separator for use between the positive and negative plates thereof.

The desirable characteristics of battery separators are generally recognized and include particularly rigidity, inertness, porosity, and impermeability to particles of solid matter such as frequently occur in some cells; further there should be no contamination of the electrolyte, nor should local reactions be generated by the material of the separator. A particular difficulty with separators is their tendency to "treeing"—that is the positive and negative plates tend to become bridged by metallic deposits and the separator, while it must be porous to the electrolyte, must also resist this treeing action.

This application is a continuation-in-part of my copending application, Serial No. 739,166, filed June 2, 1958, and now abandoned, which in turn is a continuation of my application, Serial No. 477,313, filed December 23, 1954, which has been abandoned.

It is a primary object of this invention to provide a new and novel battery separator of improved characteristics.

It is a particular object of the invention to provide a battery separator of improved rigidity, density and porosity.

It is a further object of the invention to provide in a separator in combination with glass fibers a non-film forming agent which binds the fibers together in a highly porous product while providing chemical inertness to the electrolyte.

It is yet another object of the invention to provide a novel process for the production of a battery separator.

In the practice of the invention glass fibers of small diameter and length are treated with a non-film forming agent such as colloidal silica or colloidal alumina; the agent serves as a binder for the fibers and is not deleteriously affected by battery service.

I have found that the separator is most suitably constituted of fibers of two sizes, each being of very considerable fineness. Preferably about 85 percent by weight of the separator is composed of fibers having a diameter of 2–3 microns having a length of ½ inch to 1 inch. Shorter fibers of a length of not greater than about $\frac{1}{16}$ inch and having a diameter of about ¼ to ½ micron comprise about 10 percent of the preferred separator, while the balance of 5 percent is most suitably the binder derived from the colloidal silica. However, the longer fibers may suitably be 75–90 percent by weight, the shorter fibers 5–15 percent and the bonding agent 5–15 percent of the separator.

In the preferred practice of the invention the flexible fibers of the finenesses noted, in an aqueous medium, are blended together in a beater and colloidal silica is added. Draining of the water through a suitable screen provides the fibers in mat form intertwisted together, forming extremely small pores and bonded by the silica. This product when dried, and if desired lightly pressured, is highly microporous, wets readily, and is rigidized by the non-film forming silica.

The product is thus relatively simple and economical to produce, the procedure being free of complicated apparatus and time consuming chemical actions. The simplicity of the process and structure is attributable to the discovery, after very considerable experimentation with silica in various forms, and particularly the silica gels, that colloidal silica, a non-film forming agent, is, when provided on suitable fiber sizes, of particular utility in a battery separator plate. Thus while the silica gel itself may have some utility, I prefer, because of the ease of production, the non-film forming agents such as colloidal silica.

The invention will be more fully understood by reference to the following detailed description and accompanying drawings wherein:

FIGURE 1 is a perspective view of the separator of invention;

FIGURE 2 is a view illustrating a step in the formation of the separator of invention; and FIGURE 3 is an enlarged perspective view with a portion broken away of the battery separator of FIGURE 1.

Referring to the drawings there is shown in FIGURE 1 at 1 the separator of invention, the micro pores being indicated at 2.

The product is preferably made as shown in FIGURE 2 by placing a slurry of glass fibers in the frame 3 having a screen bottom 4, the slurry being indicated at 5. The fibers which constitute this slurry are formed by drawing fine glass filaments and presenting the filaments as they are formed to a hot gaseous blast which softens and attenuates the fine filaments into fibers. The fibers as they are blown by the hot gaseous blast, which may have a temperature of about 3000° F. and a blast velocity of about 1600 to 1800 feet per second, are suitably collected on a screen.

Most conveniently the longer, slightly larger diameter fibers are blown separately from the small fibers and the control of the diameter and fiber length is attained by regulating the size of the filaments which are presented to the hot gaseous blast and/or controlling the velocity and temperature of the blast itself.

The greater the intensity of the blast as to heat and velocity the more a given filament is attenuated, and further the shorter the fiber produced from the filaments would be, thus generally fibers of about ¼ to about ¾ of a micron are attained having a length not greater than about $\frac{1}{16}$ of an inch. When the filaments are not so highly attenuated, that is when the blown fibers have a diameter of about 2 to 3 microns, the length of the fibers will also be greater, being about ½ to 1 inch.

In the preferred practice of the invention the slurry at 5 will have about 85 percent by weight of blown fibers having an average diameter of about 2 to 3 microns and a length of about ½ to 1 inch, 10 percent of the weight will be the smaller diameter fibers and about 5 percent will be silica, the above weights being on a dry basis.

The slurry which includes the above noted components, has sufficient water to readily disperse the fibers, is placed on a screen 4 and the water drains through, leaving a product such as that illustrated in FIGURE 1.

In order to compact the plate, a light weight such as a metal plate 7, which closely fits the frame 3 may be placed on the slurry to accelerate the passage of the water through the screen 4 and to lightly compact the fibers of the separator. Such a weight 7 also tends to improve the rigidity of the final product.

Upon removal from the frame 3 the product is completely dried as shown at 8, is in a micro porous condition, attained by the combination of the small diameter fibers intermingled with the still fine, but nevertheless longer diameter fibers.

The non-film forming silica is of the utmost importance to the product as the formation of any film will destroy the porosity so necessary to a battery separator. The silica itself is not apparent in the product, but comparison with products made with and without a non-film forming agent, fairly indicates that the silica materially rigidizes the product and renders the same resistant to flaking. Alumina, which is also non-film forming, is useful, with a lesser degree of utility, in battery separator plates.

Useful compositions in weight percentages are indicated in the following table:

| | | | | | |
|---|---|---|---|---|---|
| Large Fiber | 75 | 80 | 85 | 85 | 90 |
| Small Fiber | 15 | 15 | 10 | 5 | 5 |
| Silica | 10 | 5 | 5 | 10 | 5 |

In each of the above compositions the small diameter fibers provide for small pores in the plate and the size of the pores decreases as the quantity of small diameter fibers increases.

As previously pointed out, the colloidal silica and alumina binder provides a fairly rigid product. In some instances this is not entirely desirable as, for example, when the separator is to be used in a battery designed for heavy earth moving equipment where the normal usage of the machine subjects the battery to repeated jarring and bumping action which could break the bonded joints of the fibers. In separators used in batteries designed for heavy duty equipment of this type, it is desirable that a more flexible binder be added to the separator so that it will retain its integrity in the event the more rigid bonded joints should be broken. A thermoplastic material such as asphalt is suitable for this purpose and may be used in an amount in the range of about 3% to 20% of the total weight of the separator. Preferably only 3% to 5% asphalt is used since it is desirable to avoid film formation on the fibers. The asphalt is added after the separator is formed and dried and preferably is added in the form of a hot melt spray although it may be applied in the form of a solution containing 2% to 15% asphalt in a suitable solvent. When a thermoplastic binder is used, the large fibers are present in the product in an amount between 65% to 87% by weight, the smaller fibers in an amount between 5% to 15% by weight, and the colloidal bonding agent in an amount between 5% to 10% by weight. Specific compositions in weight percentages are indicated in the following table:

| | | | | | |
|---|---|---|---|---|---|
| Large Fibers | 65 | 65 | 75 | 80 | 87 |
| Small Fibers | 10 | 15 | 15 | 10 | 5 |
| Colloidal Binder | 5 | 10 | 5 | 7 | 5 |
| Thermoplastic Binder | 20 | 10 | 5 | 3 | 3 |

It will be understood that this invention is susceptible to modification in order to adopt it to different usages and conditions and accordingly, it is desired to comprehend such modifications within this invention as may fall within the scope of the appended claims.

What I claim is:

1. A composite glass fiber article adaptable for use as a battery separator plate comprising a glass fiber mat having a multiplicity of fine pores and characterized by a degree of flexibility comprising by weight about 65% to about 87% of glass fibers having a diameter of about 2 to about 3 microns and a length of about ½ inch to about 1 inch, about 5% to about 15% glass fibers having a diameter of about ¼ to about ½ micron and a length of not greater than 1/16 inch, about 5% to about 10% of a non film-forming binder of at least one member selected from the group consisting of colloidal silica and colloidal alumina and about 3% to about 20% by weight of a thermoplastic binder.

2. A composite article as described in claim 1 wherein the non film-forming binder is colloidal silica.

3. A composite article as described in claim 1 wherein the non film-forming binder is colloidal alumina.

4. A composite article as described in claim 1 wherein the thermoplastic binder is asphalt.

References Cited in the file of this patent

UNITED STATES PATENTS

| 1,942,668 | Smith | Jan. 9, 1934 |
| 2,117,371 | Slayter | May 17, 1938 |
| 2,457,784 | Slayter | Dec. 28, 1948 |
| 2,578,534 | Giles et al. | Dec. 11, 1951 |
| 2,728,699 | Labino | Dec. 27, 1955 |
| 2,787,542 | Labino | Apr. 2, 1957 |
| 2,906,660 | Hungerford et al. | Sept. 29, 1959 |
| 2,919,211 | Labino | Dec. 29, 1959 |